United States Patent [19]

Hare

[11] 4,256,524
[45] Mar. 17, 1981

[54] PROCESS FOR SOLVENT BONDING BLENDED NONWOVEN FABRICS AND FABRIC PRODUCED THEREFROM

[75] Inventor: Jerry B. Hare, Durham, N.C.

[73] Assignee: Monsanto Company, St. Louis, Mo.

[21] Appl. No.: 744,920

[22] Filed: Nov. 26, 1976

[51] Int. Cl.³ ............................................. C09J 5/00
[52] U.S. Cl. .................................. 156/220; 156/305; 156/308.2; 428/171; 428/195; 428/288; 428/360
[58] Field of Search ............. 428/288, 289, 290, 297, 428/360, 412, 483, 901, 296, 195, 198; 156/305, 306, 308.2, 220

[56] References Cited

U.S. PATENT DOCUMENTS

| 2,719,802 | 10/1955 | Nottebohm | 156/305 |
|---|---|---|---|
| 3,053,609 | 9/1962 | Miller | 156/305 |
| 3,117,055 | 1/1964 | Guandique et al. | 428/360 |
| 3,236,587 | 2/1966 | Genereux | 156/305 |
| 3,291,677 | 12/1966 | Coates et al. | 428/288 |
| 3,574,523 | 4/1971 | Hudson et al. | 428/296 |

*Primary Examiner*—James J. Bell
*Attorney, Agent, or Firm*—Thomas N. Wallin; Donald J. Fitzpatrick

[57] ABSTRACT

A process for solvent bonding blended nonwoven fabrics is disclosed. The fabric is obtained by forming a web from a blend of fibers selected from the group consisting of acrylic fibers, modacrylic fibers and mixtures thereof and polyester fibers, applying a controlled amount of solvent to the web, and then bonding contiguous fibers at their cross-over points by the application of heat and pressure so as to activate the solvent. The fabric thereby obtained is characterized by improved elongation and tear strength.

8 Claims, No Drawings

PROCESS FOR SOLVENT BONDING BLENDED NONWOVEN FABRICS AND FABRIC PRODUCED THEREFROM

BACKGROUND OF THE INVENTION

1. Field of the Invention

This invention relates to a process for manufacturing nonwoven fabrics and more specifically to a process for manufacturing nonwoven fabrics that comprise a blend of acrylic fibers, modacrylic fibers and mixtures thereof and polyester fibers and to a fabric produced therefrom.

2. Description of Prior Art

There are many methods for bonding fibers within a web of a nonwoven fabric. Two widely accepted methods are needle punching and solvent bonding. In U.S. Pat. No. 3,199,167 there is disclosed a method for manufacturing nonwoven fabrics composed of natural and synthetic fibers, including acrylic and modacrylic fibers. The disclosed method uses in combination needle punching and binder materials. It is well known that needle punching can result in broken fibers and the use of binders can adversely affect dyeability.

U.S. Pat. No. 3,053,609 discloses a method for bonding webs of natural and synthetic fibers into fabrics by using fiber solvents. There is disclosed a wide variety of fibers, both natural and synthetic, which can be treated to form a fibrous textile material. It has been found, however, that while acrylic fibers can be bonded by solvents into a fabric there is some degradation in certain physical properties. Although a satisfactory level of tensile strength can be obtained by solvent bonding, low strip elongations and tear strength levels are present in such solvent bonded nonwoven fabrics.

SUMMARY OF THE INVENTION

The process of this invention produces a solvent bonded blended nonwoven fabric having good elongation and tear strength. The process comprises the steps of: forming a web from a blend of fibers selected from the group consisting of acrylic fibers, modacrylic fibers and mixtures thereof and polyester fibers; applying a controlled amount of solvent to the web; and bonding contiguous fibers at their cross-over points by the application of heat and pressure so as to activate the solvent.

It is therefore an object of this invention to provide a new process for solvent bonding nonwoven webs of blended fibers.

A further object of this invention is to provide a process for bonding nonwoven webs of blended fibers thereby producing fabrics having improved physical properties.

A still further object of this invention is to obtain a nonwoven fabric characterized by improved elongation and tear strength.

DETAILED DESCRIPTION OF THE PREFERRED EMBODIMENT

The present invention relates to nonwoven webs of blends of synthetic organic polymers. The fibrous material to be treated in accordance with this invention may be in different forms. The material may consist of or comprise staple fibers, monofilaments or continuous filament yarns. The manner of web formation is not critical in achieving the objects of this invention. The weight of the web or fabric may be 4 to 400 grams per square meter.

It has been found that solvent bonded nonwoven webs containing 100% acrylic fibers do not exhibit elongation and tear resistance comparable to nonwoven webs of other polymers, e.g. polyamides and polyesters. It is believed that when acrylic webs are bonded by solvents there is a reorientation within the polymer crystalline structure. It is theorized that the action of the solvent weakens the polymer chain with a concomittant loss in physical properties, namely, elongation and tear strength. It is further believed that this phenomenon is also present in nonwoven fabrics containing 100% modacrylic fibers. As used herein modacrylic fibers are construed as fibers within the Federal Trade Commission definition, that is, manufactured fiber in which the fiber-forming substance is any long-chain synthetic polymer composed of at least 35% by weight of acrylonitrile units.

Suitable fiber solvents that can be used in practicing this invention include ethylene carbonate, propylene carbonate, dimethyl sulfone, tetramethylene sulfone, dimethyl formamide, dimethyl acetamide gamma-butyolactone, trimethylene carbonate, and the like. Preferred solvents include ethylene carbonate, propylene carbonate and mixtures thereof.

It has been discovered that when a second polymer is blended with acrylics or modacrylics, that is inert to the solvent an improvement in physical properties is achieved. Particularly useful synthetic organic fibers and filaments which can be blended according to this invention include those prepared from polyesters, and copolyesters such as condensation products of ethylene glycol and terephthalic acid, and mixtures of terephthalic/isophthalic acids.

Modacrylics are important industrial fibers because they possess excellent flame resistance. In order for a modacrylic fabric to retain this desirable property and pass certain tests such as D OC-FF-3-71, Children's Sleepwear Test, the fabric must not be diluted with too much second polymer. To retain flame retardance it has been found that about 5-30% of a second polymer can be blended with the modacrylic fibers.

To modify acrylic nonwoven fabrics a higher percentage of a second polymer can be tolerated. A broad range of 5-50% by weight, and a preferred range of 10-30% by weight of the second polymer can be used.

The quantity of solvent for bonding employed in practicing this invention must be controlled. If too much solvent is applied to the uncompacted web, the finished bonded fabric will be stiff and board-like. The quantity applied should effect bonding at a sufficient number of cross-over points to impart a desired strength level while at the same time enable any excess solvent to be flashed off or volatilized during subsequent compaction. It has been found that an operable quantity of solvent to give satisfactory bonding and subsequent removal is up to 10% by weight of the fabric. The quantity of solvent is applied to the fabric surfaces. A particularly effective manner for application of the solvent is in the form of a mist. An aqueous solution is prepared and then sprayed onto the fabric surfaces. Ethylene carbonate and propylene carbonate are good bonding solvents for acrylic and modacrylic fibers. Furthermore, polyester fibers used for blending, and especially polyethylene terephthalate are inert to these particular solvents. An aqueous solution is prepared by dissolving crystals of the aforementioned compounds or mixtures of them in various proportions. A concentration of 5% to 20% by weight of the solvent in the aqueous solution can be used and a preferred range is 10% to 20%. A 50% wet-add on is then applied to the fabric so that the concentration of the solvent is broadly 2.5% to 10% and preferably 5% to 10% of the fabric weight. The mist is applied to both surfaces of the fabric to insure bonding at a sufficient number of contiguous cross-over points of the fibers. A preferred mode is to apply the solvent mist simultaneously to both sides of the fabric.

Bonding occurs following application of the solvent, and takes place when the solvent can plasticize the filaments. Upon activation of the solvent, usually by heat, the filaments are attacked by the solvent coating thereby producing a spot-welding effect at filament cross-over points. By controlling the quantity and volatility of the solvent evaporation will readily occur thereby leaving a textile structure composed of only filaments. The judicious use of heat can further enhance bonding.

Another important parameter which controls bonding is the application of pressure to the uncompacted web. Web compaction can force the fibers together at their cross-over points therein producing stronger bonds. Compaction can be accomplished in two modes. The web can be pressed or passed between two smooth surfaces for over-all surface compaction. Alternatively, the web can also be passed or pressed between a pair of surfaces, one of which is smooth and the other surface being embossed or engraved. This type of compaction will produce a network of discrete bond sites while the remainder of the web remains substantially uncompacted.

Regardless of the mode of compaction tear strength and elongation are improved by the process of this invention because of the presence of blended fibers that are inert to the plasticizing action of the solvent. These fibers retain their strength level and are not impaired upon activation of the solvent during bonding.

The products of this invention exhibit very desirable properties for nonwoven textiles and these properties were evaluated in the following manner:

Evaluation of Physical Properties

The tensile properties are measured on an Instron Tensile Tester at 20° C. and 65% relative humidity. Strip tenacity and breaking strength is determined for a sample 2.54 cm wide using a 12.7 cm gauge length and is expressed as cm/m$^2$. Percent strip elongation is determined by dividing the gauge length at break minus the original gauge length by the original gauge length and multiplying this result by 100.

The tear resistance of the fabric is determined by the trapezoidal method and by means of the falling pendulum (Elmendorf) apparatus. In the trapezoidal method a precut trapezoidal sample is clamped in an Instron Tester with the non-parallel trapizoid sides aligned with the outside parallel edges of the clamps so that one edge is taunt and pulled apart thereby tearing the fabric with the tear propagating toward the loose edge.

The procedure for the falling pendulum method is described in ASTM specification D-1423-63. In this test the average force required to continue a tongue-type tear in a fabric is determined by measuring the work done in tearing it through a fixed distance.

Drape flex (or bending length) is determined by using a sample 2.54 cm wide and 15.4 cm long and moving it slowly in a direction parallel to its long dimension so that its end projects from the edge of a horizontal surface. The length of the overhang is measured when the tip of the sample is depressed under its own weight to the point where the line joining the tip to the edge of the platform makes an angle of 41.5° with the horizontal. One-half of the length is the drap flex of the specimen, reported in inches or centimeters.

The following specific example illustrates the manner of preparation of fabrics of this invention and the results of tests performed on such fabrics and a fabric of the prior art.

EXAMPLE

A series of 30.5 cm square sample webs were cut from full width webs made on a Rando-Webber machine. The operation of this machine is described in the text, "Nonwoven Fabrics," by Francis M. Buresch, 1962, published by Reinhold Publishing Company on pages 14–19. Blend composition and web basis weights are set forth below in a property table. After the webs were formed they were sprayed on both surfaces with an aqueous solvent mist. The majority of the samples were sprayed with a mist composed of 75% ethylene carbonate and 25% propylene carbonate. The remaining samples were sprayed with an ethylene carbonate mist. The webs were placed between two Teflon (a trademark of E. I. duPont de Nemours & Company) coated aluminum plates and pressed in a platen press at a temperature of 140° C. and at a force at 5 tons (5080 kg) for 60 seconds. In one mode two smooth plates were used and in a second mode an embossed engraved plate was substituted for a smooth plate. Table I set forth below shows the blend compositions of the fabrics prepared and the solvent concentration used for bonding the fibers.

TABLE I

| Fabric Identification | Blend Composition | Solvent* Content, % |
|---|---|---|
| 1 | 100% acrylic | 2.5 |
| 2 | | 5.0 |
| 3 | | 7.5* |
| 4 | 100% modacrylic | 2.5 |
| 5 | | 5.0 |
| 6 | 90% modacrylic, 10% polyester | 2.5 |
| 7 | | 5.0 |
| 8 | 70% modacrylic, 30% polyester | 5.0* |
| 9 | | 5.0 |
| 10 | | 10.0* |
| 11 | | 10.0 |
| 12 | 90% acrylic, 10% polyester | 2.5 |
| 13 | | 5.0 |
| 14 | 70% acrylic, 30% polyester | 5.0 |
| 15 | | 10.0 |
| 16 | 50% acrylic, 50% polyester | 5.0 |
| 17 | | 10.0 |

*solvent, 10% and 20% solutions of ethylene carbonate

The results of tests performed on webs of Table I produced in the manner described in this Example are set forth below in Table II.

TABLE II

| | Fabric Identification | | | | | | | | | | | | |
|---|---|---|---|---|---|---|---|---|---|---|---|---|---|
| | 1 | 2 | 3 | 4 | 5 | 6 | 6 | 7 | 8 | 8 | 9 | 9 | 10 | 10 |
| Bonding Mode | | | | | | | | | | | | | | |
| Pattern Bonding | (2) | (2) | Yes | (2) | (2) | Yes | | (2) | Yes | | Yes | | Yes | |

TABLE II-continued

| Fabric Identification | | | | | | | | | | | | | | |
|---|---|---|---|---|---|---|---|---|---|---|---|---|---|
| Overall Bonding Property | | | | | | Yes | | | Yes | | Yes | | Yes |
| Web basis weight g/m² | 33.9 | 33.9 | 33.9 | 33.9 | 33.9 | 33.9 | 33.9 | 33.9 | 40.7 | 47.5 | 33.9 | 33.9 | 47.5 | 47.5 |
| Strip tenacity g/cm/g/m² | — | — | — | — | — | 9.4 | 18.3 | — | 8.4 | 18.3 | 11.0 | 15.7 | 14.6 | 16.7 |
| Strip tenacity (1) g/cm/g/m² | — | — | 12.0 | — | — | — | — | — | 14.6 | 27.2 | — | — | 18.8 | 26.7 |
| Strip elongation, % | — | — | — | — | — | 11.7 | 3.5 | — | 13.8 | 6.3 | 19.8 | 15.3 | 19.9 | 10.9 |
| Trapezoidal tear g/g/m² | — | — | — | — | — | 19.1 | 15.3 | — | 23.0 | 21.1 | 55.5 | 57.4 | 23.0 | 21.1 |
| Elmendorf, g | — | — | 70 | — | — | — | — | — | 480 | 217 | — | — | 517 | 180 |
| Bending length, cm | — | — | — | — | — | 3.0 | 4.6 | — | 4.1 | 4.1 | 3.8 | 3.6 | 5.6 | 4.3 |
| Thickness, mils | — | — | — | — | — | 7.7 | 4.0 | — | — | — | 8.1 | 5.0 | — | — |

| | 11 | 11 | 12 | 12 | 13 | 14 | 14 | 15 | 15 | 16 | 16 | 17 | 17 |
|---|---|---|---|---|---|---|---|---|---|---|---|---|---|
| Bonding Mode | | | | | | | | | | | | | |
| Pattern Bonding | Yes | | Yes | | (2) | Yes | | Yes | | Yes | | Yes | |
| Overall Bonding Property | | Yes | | Yes | | | Yes | | Yes | | Yes | | Yes |
| Web basis weight g/m² | 33.9 | 33.9 | 33.9 | 33.9 | 33.9 | 33.9 | 33.9 | 33.9 | 33.9 | 33.9 | 33.9 | 33.9 | 33.9 |
| Strip tenacity g/cm/g/m² | 15.2 | 15.2 | 5.2 | 7.8 | — | 7.8 | 9.9 | 16.2 | 22.2 | 5.2 | 5.2 | 23.0 | 28.2 |
| Strip tenacity (1) g/cm/g/m² | — | — | — | — | — | — | — | — | — | — | — | — | — |
| Strip elongation, % | 19.8 | 21.5 | 9.8 | 4.4 | — | 15.3 | 12.7 | 21.1 | 20.8 | 18.0 | 11.3 | 25.1 | 24.7 |
| Trapezoidal tear g/g/m² | 45.9 | 47.8 | 13.4 | 19.1 | — | 38.3 | 34.4 | 47.8 | 38.3 | 38.3 | 24.9 | 82.3 | 72.7 |
| Elmendorf, g | — | — | — | — | — | — | — | — | — | — | — | — | — |
| Bending length, cm | 3.8 | 3.6 | 2.8 | 4.1 | — | 2.8 | 3.6 | 3.6 | 4.1 | 2.5 | 3.0 | 3.8 | 4.6 |
| Thickness, mils | 8.3 | 3.7 | 10.3 | 5.3 | — | 7.7 | 4.6 | 9.8 | 4.0 | 8.2 | 5.7 | 8.8 | 4.8 |

Notes
1. 2.54 cm length used
2. application of solvent caused web to become film-like, all fiber appearance was destroyed therefore properties could not be evaluated.

The following conclusions can be reached by analyzing the data shown in this table.

Fabric produced by the process of this invention is characterized by improved strip tenacity, elongation and tear strength over fabric composed of 100% acrylic fibers and 100% modacrylic fibers.

Having described a new process for making blended nonwoven fabrics, it is understood that modifications and variations may be resorted to without departing from the spirit and scope of the invention, as those skilled in the art will readily understand. Such modifications and variations are considered to be within the spirit and scope of the invention as defined in the appended claims.

I claim:

1. A process for manufacturing nonwoven fabrics having improved elongation and tear strength, comprising the steps:
   forming a web from a blend of fibers selected from the group consisting of acrylic fibers, modacrylic fibers and mixtures thereof, and polyester fibers;
   applying a controlled amount of a fiber solvent, said solvent being selected from the group consisting of ethylene carbonate, propylene carbonate and mixtures thereof, to the web, wherein said amount is up to about 10% of the weight of said web; and bonding contiguous fibers at their cross-over points by the application of heat and pressure so as to activate the solvent.

2. The process defined in claim 1 wherein said blend contains from about 5% to about 50% by weight of polyester fibers and the balance essentially acrylic fibers.

3. The process defined in claim 2 wherein said blend contains from about 10% to about 30% by weight of polyester fibers.

4. The process defined in claim 1 wherein said blend contains from about 5% to about 30% by weight of polyester fibers and the balance essentially modacrylic fibers.

5. The process defined in claim 1 wherein said polyester fibers are made of polyethylene terephthalate polymer.

6. The process defined in claim 1 wherein the solvent is simultaneously applied to both sides of said web in the form of a mist prepared from an aqueous solution.

7. The process defined in claim 1 wherein the web is bonded by applying pressure from a pair of opposed smooth surfaces.

8. The process defined in claim 1 wherein the web is bonded by applying pressure from a smooth surface and an opposed embossed surface.

* * * * *